Patented Dec. 16, 1952

2,622,076

UNITED STATES PATENT OFFICE 2,622,076

CATALYTIC PROCESS FOR PREPARING HIGH MOLECULAR WEIGHT LINEAR MACROMOLECULAR AMINO ACID-POLYCONDENSATES FROM LACTAMS

Theodoor Koch, Oosterbeek, Netherlands, assignor to N. V. Onderzoekingsinstituut Research, Arnhem, Netherlands, a corporation of the Netherlands No Drawing. Application May 29, 1950, Serial No. 165,106. In the Netherlands July 22, 1949

4 Claims. (Cl. 260—78)

This invention relates to the preparation of high molecular weight linear macromolecular amino acid-polycondensation products from monomeric lactams having six or more carbon atoms. More particularly, the invention relates to the preparation of polycondensation products of the kind indicated by a procedure that involves condensing monomeric lactams having six or more carbon atoms in the presence of a novel class of condensation catalysts.

One of the principal objects of the present invention is to provide a new and improved method for preparing high molecular weight macromolecular polycondensation products from monomeric lactams having six or more carbon atoms. A still further object of the invention is to provide a method for preparing high molecular weight linear polyamide condensation products from lactams of the kind indicated, by carrying out the condensation in the presence of a novel class of catalysts whereby one obtains the desired polycondensation products having good physical properties in a simpler fashion and in a shorter time.

The manner in which these and other objects and features of the invention are attained will appear more fully from the following description thereof, in which reference is made to typical and preferred procedures in order to indicate more fully the nature of the invention, but without intending to limit the invention thereby.

It is already known that macromolecular polycondensation products of the linear polyamide type comprising structural units having the general formula ... —NH(CH$_2$)$_n$CO— ..., where $n$ is an integer at least five, may be made from the corresponding monomeric lactams having six or more carbon atoms by heating the monomeric lactams at high temperatures in the presence of water (British Patent No. 535,421). However, in a process of this kind it is necessary to perform the heating, which takes place at a temperature of 200° to 300° C., in a closed vessel under pressure, since otherwise the water added for bringing about the desired condensation will have evaporated before the reaction has progressed sufficiently far.

In addition to water it has also been suggested to employ a series of other substances which promote the condensation of lactams (see Dutch Patent No. 52,931). These substances may be of an organic or an inorganic nature. When organic substances are employed in accordance with this method, however, the quality of the polymer may be adversely influenced by their presence, while the polymerization or condensation times are relatively long. For instance, in the examples mentioned in the specification of the aforesaid Dutch patent these condensation times vary from 30 to 64 hours. Moreover, the substances employed as reaction promoters are frequently rather difficultly obtainable, such as for example the aminocaproic acid mentioned therein. On the other hand, when inorganic catalysts (e. g. lithium chloride) are employed, at a concentration of 2% catalyst the condensation requires a total time of 48 hours. The hydrochloride of aminocaproic acid mentioned in Examples 1 and 2 of the Dutch patent gives rise not only to a very long reaction time (65 hours) but also to a sticky and less water-resistant final condensation product.

According to the present invention, I have discovered that it is possible to obtain a very rapid conversion of lactams of the kind indicated above to the desired linear polyamides if one employs as catalysts small quantities of strongly hydrated oxides derived from the elements belonging to the secondary group of group IV of the periodic system as shown on page 310 of the "Handbook of Chemistry and Physics," 30th edition, 1947. These elements are titanium, zirconium, cerium, hafnium and thorium.

The catalysts which are suitable according to the present invention may in general be defined by the formula Me(OH)$_x$ or MeO(OH)$_y$, where Me represents one of the metals mentioned above and $x$ and $y$ are small whole numbers such that they satisfy the valency requirements of the metal in question. Thus, examples of satisfactory catalysts are Ti(OH)$_4$, TiO(OH)$_2$, Th(OH)$_4$, Ce(OH)$_3$, etc.

It is important to note at the outset that the process according to the present invention is not to be confused with the process described in British Patent No. 576,647 wherein it is suggested that the quality of polyamide fibers may be improved by adding thereto very small quantities of finely divided substances (among which TiO$_2$ is mentioned) to the molten polyamide material. According to this British patent the substances to be employed are entirely "inert" and are such as do not bring about any chemical reaction on or with the polymer.

In order to insure a high activity of the catalysts employed according to the present invention, it is very desirable that the catalytic substances be employed in very finely divided state, and that they possess in this suspended state a sufficiently high electric charge that they will remain of their own accord in a completely homogeneous suspension. The best results are obtained with freshly prepared suspensions, because in general it is found that undesirable ageing phenomena may occur with the passage of time.

Furthermore, the activity of these strongly hydrated oxide substances tends to change in an undesirable direction if the strongly hydrated metal compounds are permitted to dry up more or less or if they are heated to high temperatures. Thus, calcined $TiO_2$, as employed for example according to the British Patent No. 576,647, is entirely unsuitable for use in the process of the present invention.

On the other hand, the peptization of the particles of the strongly hydrated metal compounds that are employed herein can be increased still further by adding small quantities of an acid or a base, because the electric charge is thereby increased. Preferably inorganic peptizing agents, such as phosphoric acid and sulfuric acid, are chosen.

The quantity of the metal or metal oxide-hydrates employed for conversion of the monomeric lactams in accordance with the present invention is generally very small, and varies for example from about 0.005% to about 0.3%, calculated on the monomeric lactam undergoing polymerization. As a matter of fact, it has been found that larger quantities tend to exert a less favorable influence on the properties of the final condensation product.

Because of the very fine degree of dispersion of the catalyst particles according to the present invention, there is practically no question of any decrease in lustre of the final polymer product, in contrast with the well known use and application of $TiO_2$ as a delustring agent. However, if desired the catalytic action of the fine hydrate suspensions of the present invention can also be utilized for the conversion of lactams to which at the same time a quantity of known delustring agent, such as calcined $TiO_2$, has been added.

Examples of monomeric lactams which are suitable for use in the present process are epsilon-caprolactam, zeta-heptanoic acid lactam, eta-octanoic acid lactam, etc. Branched or substituted lactams, such as for example methyl-2-cyclohexanoneisoxime, can also be employed as the initial material, although the polymerization products in the form of fibers or threads thus obtained are generally less valuable.

While epsilon-caprolactam has a somewhat smaller tendency toward polymerization or condensation than lactams having more than seven atoms in the ring, for economic reasons the epsilon-caprolactam is generally preferred.

A further advantage of the present process that is quite important from the commercial standpoint is that the polymerization need not be carried out in closed vessels under pressure because it is not necessary that relatively volatile substances, such as water, be present in high concentration during the reaction.

It is desirable to exclude atmospheric oxygen, for example by means of a simple liquid seal, particularly if a satisfactorily colorless final product is required.

In some cases it may be desirable, for example when only a somewhat less stable suspension of relatively coarse catalyst particles is available, to subject such suspension to a mechanical treatment in a special mill in order to increase the degree of dispersion of the catalyst particles. For example, the catalyst particles may be subjected to grinding in a conventional colloid mill or other similar apparatus.

In order to indicate still more fully the nature of the present invention the following examples of typical procedure are set forth, it being understood that this description is presented by way of illustration only and not as limiting the scope of the invention.

*Example 1*

By hydrolysis of a solution of titanium sulfate in water at the lowest possible temperature, a very fine suspension of meta-titanic acid $$TiO(OH)_2$$

was prepared. The very fine precipitate was washed in a dialyzer with distilled water.

Caprolactam was then mixed with so much of the concentrated, moist suspension that the mixture contained 0.25% $TiO(OH)_2$.

Upon heating this mixture for six hours at 255° C. in an open tube in which a nitrogen atmosphere was maintained, a polymer or condensation product having an intrinsic viscosity of 0.85 was obtained.

*Example 2*

A solution of titanium sulfate in water was precipitated with a small excess of ammonia, whereby a gelatinous precipitate of $Ti(OH)_4$ was formed, which was then washed out by decanting.

Sufficient of the still moist $Ti(OH)_4$ was added to 10 grams of caprolactam to provide a concentration of 0.15% of the dry catalytic material. At the same time 0.075% phosphoric acid $(H_3PO_4)$ was added in order to prevent flocculation of the catalyst particles during the subsequent heating. This mixture was then introduced into a tube which had been drawn out to a bent capillary, after which the air still present in the tube was replaced by nitrogen. The tube containing the reaction mixture was held in such manner that the mouth of the capillary was situated below the level of a body of petroleum ether disposed in an open vessel, so that upon heating the reaction mixture no excess pressure could develop in the tube and yet the contents of the tube were protected from atmospheric oxygen.

The reaction mixture was heated to 255° C. in the vapor of boiling "Dowtherm," diphenyl oxide. During the heating operation the catalyst remained entirely in suspension.

After a period of heating of five hours a polymer or condensation product having an intrinsic viscosity of 0.92 was obtained. This polymer was easily capable of being spun to fibers which were readily cold-drawn to 4.5 times their original length.

In another experiment in which the caprolactam was heated in the same way but with as much phosphoric acid and as much water as was present in $Ti(OH)_4$ suspension, it was found that after five hours' heating no threads could be formed from the reaction mass because the degree of polymerization thereof was insufficient.

*Example 3*

Here the procedure was the same as that set forth in Example 2, except that 10 grams of zeta-heptanoic acid lactam were mixed with 0.1% of a thorium hydroxide gel and 0.05% of sulfuric acid. After a heating period of four hours the molten polymer or condensation product could be spun into threads having good mechanical properties.

Further experiments with hydrated oxides of the remaining metals of the cited secondary group of the group IV of the periodic system produced correspondingly good results in the catalytic polymerization or condensation of lactams to linear polyamides.

While specific examples of preferred methods embodying the present invention have been set forth above, it will be apparent that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:

1. A process for the catalytic conversion of monomeric lactams having at least six carbon atoms to high molecular weight linear macromolecular polycondensation products which comprises heating monomeric lactams having at least six carbon atoms under substantially atmospheric pressure but with the substantial exclusion of oxygen and in the presence of about 0.005% to about 0.3%, based on the weight of the monomeric lactam, of an undried catalyst prepared in aqueous medium, selected from the class consisting of catalytically active, substantially non-delustering hydroxides and hydrated oxides having the formulae $Me(OH)_x$ and $MeO(OH)_y$, respectively, where Me represents an element selected from the class consisting of titanium, zirconium, cerium, hafnium and thorium and $x$ and $y$ are small whole numbers satisfying the valency requirements of the said element.

2. A process as in claim 1, wherein the catalyst present in the lactam-containing reaction mixture is kept in suspension by adding thereto a small quantity of an inorganic acid selected from the class consisting of phosphoric acid and sulphuric acid.

3. A process as in claim 2, wherein the inorganic acid is phosphoric acid.

4. A process as in claim 2, wherein the inorganic acid is sulfuric acid.

THEODOOR KOCH.

REFERENCES CITED

The following references are of record in the file of this patent:

FOREIGN PATENTS

| Number | Country | Date |
|---|---|---|
| 870,484 | France | Dec. 12, 1941 |

OTHER REFERENCES

Moissan, Traité de Chimie Minerale Tome 2, Metalloides, Paris, 1905, pp. 504, 505 and 516.